United States Patent
Remboski et al.

(10) Patent No.: US 9,346,332 B2
(45) Date of Patent: May 24, 2016

(54) AIR SUSPENSION LOAD SHIFT SYSTEM

(71) Applicant: Dana Heavy Vehicle Systems Group, LLC, Maumee, OH (US)

(72) Inventors: Donald J. Remboski, Ann Arbor, MI (US); Douglas D. Turner, Holland, OH (US); James F. Ziech, Kalamzaoo, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 139 days.

(21) Appl. No.: 14/207,739

(22) Filed: Mar. 13, 2014

(65) Prior Publication Data

US 2015/0258871 A1 Sep. 17, 2015

Related U.S. Application Data

(60) Provisional application No. 61/782,054, filed on Mar. 14, 2013.

(51) Int. Cl.
*B60G 17/033* (2006.01)
*B60G 11/27* (2006.01)
*B60G 5/00* (2006.01)
*B60G 17/017* (2006.01)
*B60G 17/052* (2006.01)

(52) U.S. Cl.
CPC ............... *B60G 5/00* (2013.01); *B60G 17/017* (2013.01); *B60G 17/052* (2013.01); *B60G 2400/51222* (2013.01); *B60G 2400/52* (2013.01); *B60G 2400/61* (2013.01); *B60G 2500/201* (2013.01)

(58) Field of Classification Search
CPC ........ B60G 17/033; B60G 11/27; B60G 5/00; B60G 17/052; B60G 17/017; B60G 2500/201; B60G 2400/52; B60G 2400/61; B60G 2400/51222
See application file for complete search history.

(56) References Cited

U.S. PATENT DOCUMENTS

| | | | |
|---|---|---|---|
| 2,790,650 | A | 4/1957 | Boschi |
| 2,879,076 | A | 3/1959 | Stricker, Jr. |
| 3,197,231 | A | 7/1965 | Holzman |
| 3,224,522 | A | 12/1965 | Fleming |
| 3,380,758 | A | 4/1968 | Granning |
| 6,276,710 | B1 | 8/2001 | Sutton |

OTHER PUBLICATIONS

Jim Park, Test Drive: Meritor's 6x2 SmarTandem, Truckinginfo.com, Apr. 2013.
Meritor, Meritor Press Release, Meritor company website (www.meritor.com), Sep. 18, 2012.

*Primary Examiner* — Ruth Ilan
*Assistant Examiner* — Joselynn Y Sliteris
(74) *Attorney, Agent, or Firm* — Marshall & Melhorn, LLC

(57) ABSTRACT

A method for shifting tandem axle loads on a vehicle including an air suspension circuit having a three way valve, a first air spring connected between a drive axle of a tandem and a vehicle frame and a second air spring connected between a tag axle of the tandem and the vehicle frame. A diameter of the first air spring is larger than a diameter of the second air spring. The system also has an air supply, a first fluid line connected between a port one of the three way valve and the first air spring and a second fluid line connected between a port three of the three way valve and the second air spring.

13 Claims, 5 Drawing Sheets

| Parameter | Normal Mode | Tractive Mode |
|---|---|---|
| Environment | Level Ground | Level Ground |
| Operation Mode | Normal | Tractive Mode |
| Configuration | Asymmetrical Single Airbag Suspension | Asymmetrical Single Airbag Suspension |
| Pressure Front 1 (PF1) | 80 | 100 |
| Pressure Rear 1 (PF1) | 120 | 100 |
| Valve - 1 to 2 | Closed | Closed |
| Valve - 1 to 3 | Closed | Open |
| Valve - 2 to 3 | Closed | Closed |
| CTIS | Normal | Normal |
| Tire Pressure Front (TPF) | 90 | 90 |
| Tire Pressure Rear (TPF) | 90 | 90 |

AIR SUSPENSION LOAD SHIFT SYSTEM

CROSS-REFERENCE TO RELATED APPLICATIONS

This application claims the benefit of U.S. Provisional Application No. 61/782,054 filed on Mar. 14, 2013. This application is a non-provisional application filed off of U.S. patent application Ser. No. 61/782,054 filed on Mar. 14, 2013, which is incorporated by reference in its entirety herein. This non-provisional application is being filed during the pendency of U.S. patent application Ser. No. 61/782,054.

FIELD OF THE INVENTION

The present invention relates to an air suspension system for use with the tandem axles of a commercial vehicle line haul tractor.

BACKGROUND OF THE INVENTION

The typical North American Class 8 Line Haul Truck uses a 6×4 tractor with two drive axles in the tractor rear tandem. Alternately, a 6×2 drive line is used with a single drive axle and a dead tag axle in the rear tandem. The 6×2 system is lighter and has a lower parasitic loss compared to the 6×4 system, but suffers from a deficiency in tractive effort under conditions of reduced tire to ground coefficient since the drive axle and tag axle will have the same Gross Axle Weight Rating (GAWR). Systems have been offered to increase the 6×2 single drive axle tractive effort such as wheel differential locks and service brake based electronic traction control systems. Additionally, 6×2 air suspension systems are available that can automatically shift load from the tag axle to the drive axle under conditions of low traction to improve the tractive effort of the drive axle but these systems are slow acting, costly and cumbersome.

In view of the foregoing disadvantages of the prior art, it would be advantageous to have a low cost system that is fast acting, cost effective and easy to incorporate that can safely and effectively improve the 6×2 drive axle traction.

SUMMARY OF THE INVENTION

The present invention is directed toward a method for shifting tandem axle loads on a vehicle including an air suspension circuit having a three way valve, a first air spring connected between a drive axle of a tandem and a vehicle frame and a second air spring connected between a tag axle of the tandem and the vehicle frame. A diameter of the first air spring is larger than a diameter of the second air spring. The system also has an air supply, a first fluid line connected between a first port of the three way valve and the first air spring and a second fluid line connected between a third port of the three way valve and the second air spring.

In accordance with the present invention, it has been discovered that the ability to rapidly deliver air from the tag axle to the drive axle during a traction event, while maintaining the same ride height of both axles is highly desirable.

BRIEF DESCRIPTION OF THE DRAWING

The above, as well as other advantages of the present invention, will become readily apparent to those skilled in the art from the following detailed description when considered in the light of the accompanying drawings in which:

FIG. 3 is a chart illustrating air pressures and valve positions according to the present invention;

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
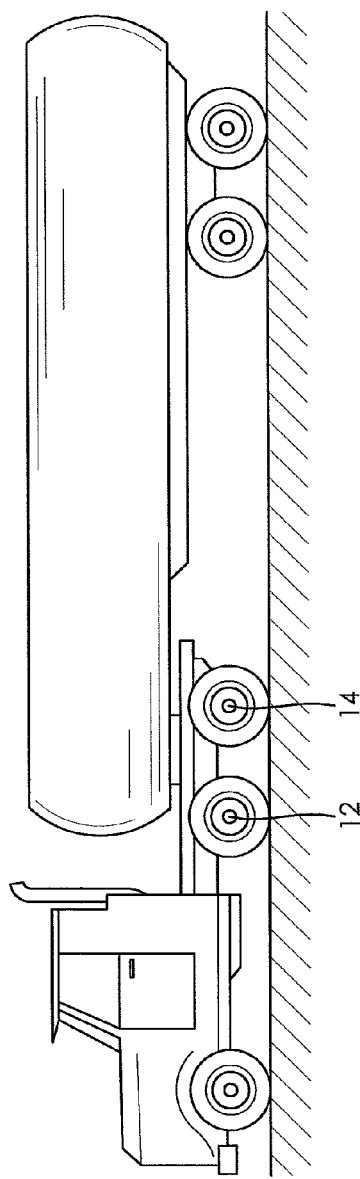
FIG. 1 is a side view of a commercial vehicle embodying the present invention.
Figure 2:
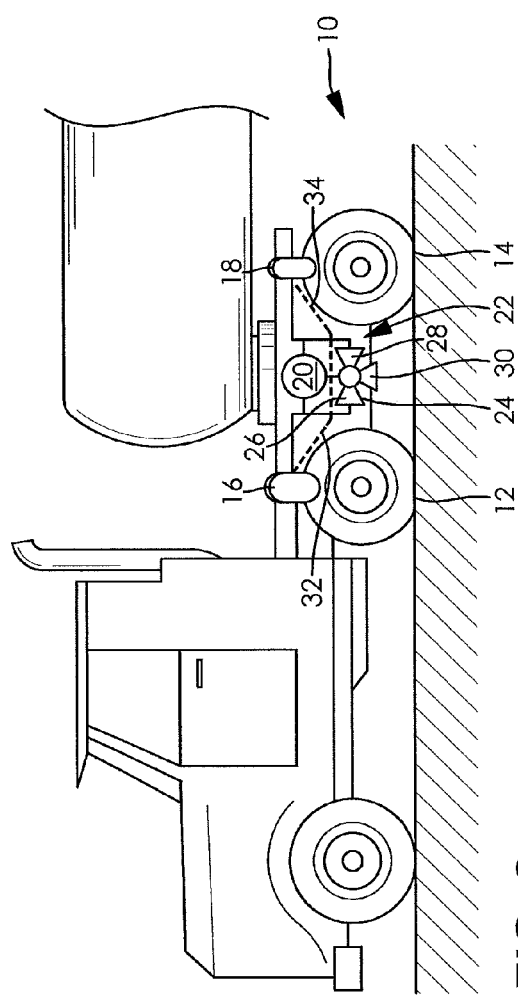
FIG. 2 is a detailed side view of a commercial vehicle embodying the present invention.

FIGS. 1 and 2 depict an air suspension system 10 for a 6×2 vehicle having a single drive axle 12, a tag axle 14, air springs 16, 18 on each axle, an air pump 20 and an automatic electro-pneumatic control system 22 to control the flow of air between the air springs 16, 18. The automatic electro-pneumatic control system 22 comprises a three-way valve 24, but it is understood that the automatic electro-pneumatic control system 22 may comprise a different type of valve and/or a different number of valves.

The three-way valve 24 is used to route air to a particular location via fluid communication lines 32, 34. In this application, port one 26 of the three-way valve 24 is connected to the front, or drive axle air springs 16. Port three 28 of the three-way valve 24 is connected to the rear, or tag axle air springs 18. More specifically, ports one and three 26, 28 are connected through the three-way valve 24 to allow the transfer of air between the drive axle and the tag axle air springs 16, 18, as described below. Port two 30 of the three-way valve 24 can be used to evacuate pressure from the drive axle air springs 16 and/or the tag axle air springs 18. One or both of the air springs 16, 18 can be selectively evacuated to return them to their original pressure or if an emergency deflation is required.

The air pump 20 provides a source for drawing air from an air reservoir (not shown), via the fluid communication lines 32, 34 to the three-way valve 24 and into the air springs 16, 18. Air moving through port one 26 is in direct communication with the drive axle air spring 16, and air moving through port three 28 is in direct communication with the tag axle air spring 18. Port two 30 acts as a connection between ports one and three 26, 28, to facilitate the flow of air from the drive axle air spring 16 to the tag axle air spring 18 and vice versa. The flow of air can also be reversed to draw air from the air springs 16, 18 and back in to the air reservoir.

The drive axle 12 comprises a larger effective diameter air spring 16 and the tag axle 14 comprises a smaller effective diameter air spring 18, as shown. The smaller diameter air spring 18 on the tag axle 14 has a higher air pressure at the normal GAWR (Gross Axle Weight Rating) of the tandem as compared to the drive axle 12. Consequently, when a larger ground load is needed on the drive axle 12 due to a traction event, such as during wet and/or other types of slippery, muddy or snowy conditions, the higher pressure from the tag axle air spring 18 can be used to rapidly and efficiently increase the pressure in the drive axle air spring 16. The ride height is maintained at or near the desired distance since lowering the load and pressure of the tag axle air spring 18 is easily compensated by the increase in pressure and load of the drive axle air spring 16.

Both the drive axle and tag axle air springs 16, 18 can have the same internal air volume at the standard ride height so that the spring rates are nearly the same. At the standard tandem GAWR of 40,000 Lbs. the maximum ground loading will be 34,000 Lbs. due to bridge laws, so that each axle will carry a ground load of 17,000 Lbs. at full payload. Consequently under normal operation mode, the tag axle air spring 18 may require a higher air pressure compared to the drive axle spring 16; for example, the tag axle air spring 18 could have an air pressure of 100 psi (6.9 Bar) and the drive axle air spring 16 an air pressure of 70 psi (4.8 Bar) but both axles 12, 14 will be at the same ground load. The tire tractive effort distribution is equal in both the drive axle 12 and the tag axle 14. These numbers are reflective of level ground conditions under normal operation mode. In this condition, all ports 26, 28, 30 in the three-way valve 24 associated with the automatic electro-pneumatic control system 22 are closed.

If a traction event is sensed, the automatic electro-pneumatic control system 22 can rapidly deliver air from the tag axle air spring 18 to the drive axle air spring 16 as needed. As illustrated in the chart on FIG. 3 under tractive mode, air pressure in the drive axle air spring 16 is increased from 80 to 100, and air pressure in the tag axle air spring 18 is decreased from 120 to 100, comparing the columns titled "Normal Mode" and "Tractive Mode". The transfer of pressure between the air springs 16, 18 is achieved by the opening of port one 26 to port three 28 in the three-way valve 24 in the automatic electro-pneumatic control system 22. Ports one to two 26, 30 and ports two to three 30, 28 remain closed.

The added pressure in the drive axle air spring 16 combined with the reduced pressure in the tag axle air spring 18 results in a higher drive axle 12 ground load and a lower tag axle 14 ground load at approximately the same ride height. After the added tractive effort is applied and the wheel slip is reduced or eliminated, the automatic electro-pneumatic control system 22 can return the air springs 16, 18 to the normal air pressures that are required for equal drive axle 12 and tag axle 14 ground loading.

During the pressure shift, a connection is made between ports one and three 26, 28. Later, when going back to the original pressures, one air spring must increase in pressure while the other air spring must decrease in pressure. The decrease in air pressure can be achieved via venting air through port two 30. The increase can happen by either the air pump 20 to port three 28 or via the air pump 20 from port one 26 to port three 28 as another embodiment; thus not venting via port two 30.

Air lines are most commonly used for connecting the air springs 16, 18 and the three-way valve 24. The front and rear air springs 16, 18 and the three-way valve 24 are all in close proximity, so the air transfer from rear tag axle air spring 18 to the front drive axle air spring 16 through the air lines can be very quick. Typically, there is an air compressor (not shown) on all commercial trucks to operate the air brake and air suspension systems. This includes an air tank but the traction drive system could have its own reservoir close to the axles so that air is quickly available and does not need to be robbed from the brakes. While tractive capability is needed for moving forward, it may also be needed for improved braking and stopping.

Various inputs to the automatic electro-pneumatic control system 22 can be incorporated by using an algorithm to improve the functionality of the load shift algorithm such as temperature, vehicle speed, steer axle turn angle, estimated vehicle total GVW and straight ahead travel wheel speed data. The algorithm may control the shifting of air pressure based on these vehicle parameters. The general concept is to try to predict when added tractive effort is needed and to then allow a weight shift for more traction. For example, if the vehicle is making a turn while at higher speeds, the system would not execute a quick weight shift as this may cause the vehicle to roll. Temperature can be used to determine the likelihood of ice on the road. Temperature also has impacts on pressure. The estimated weight may cause the algorithm to limit or increase the pressure shifts.

Figure 4:
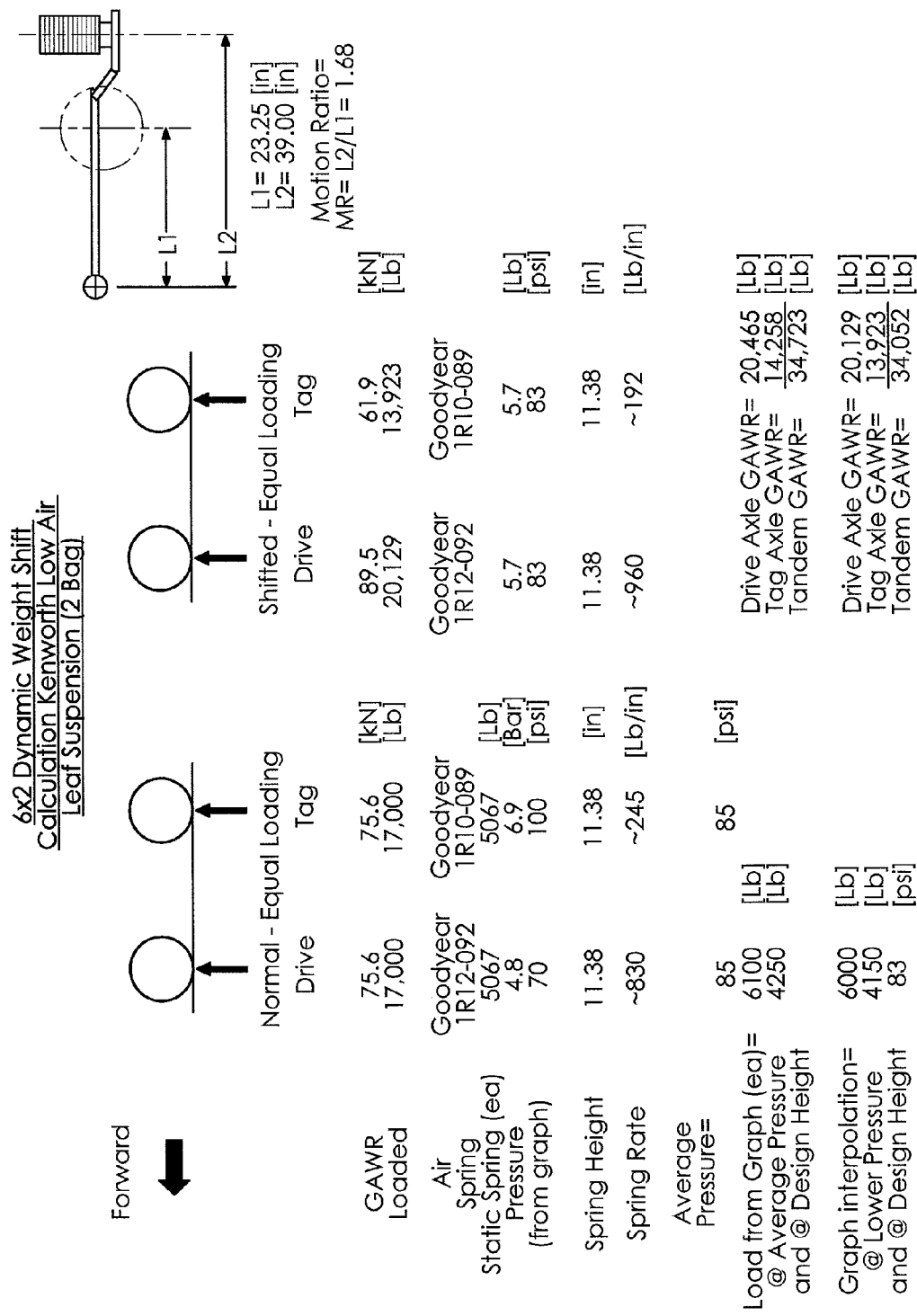
FIG. 4 is an example of a 6×2 Dynamic Weight Shift Calculation.
Figure 5:
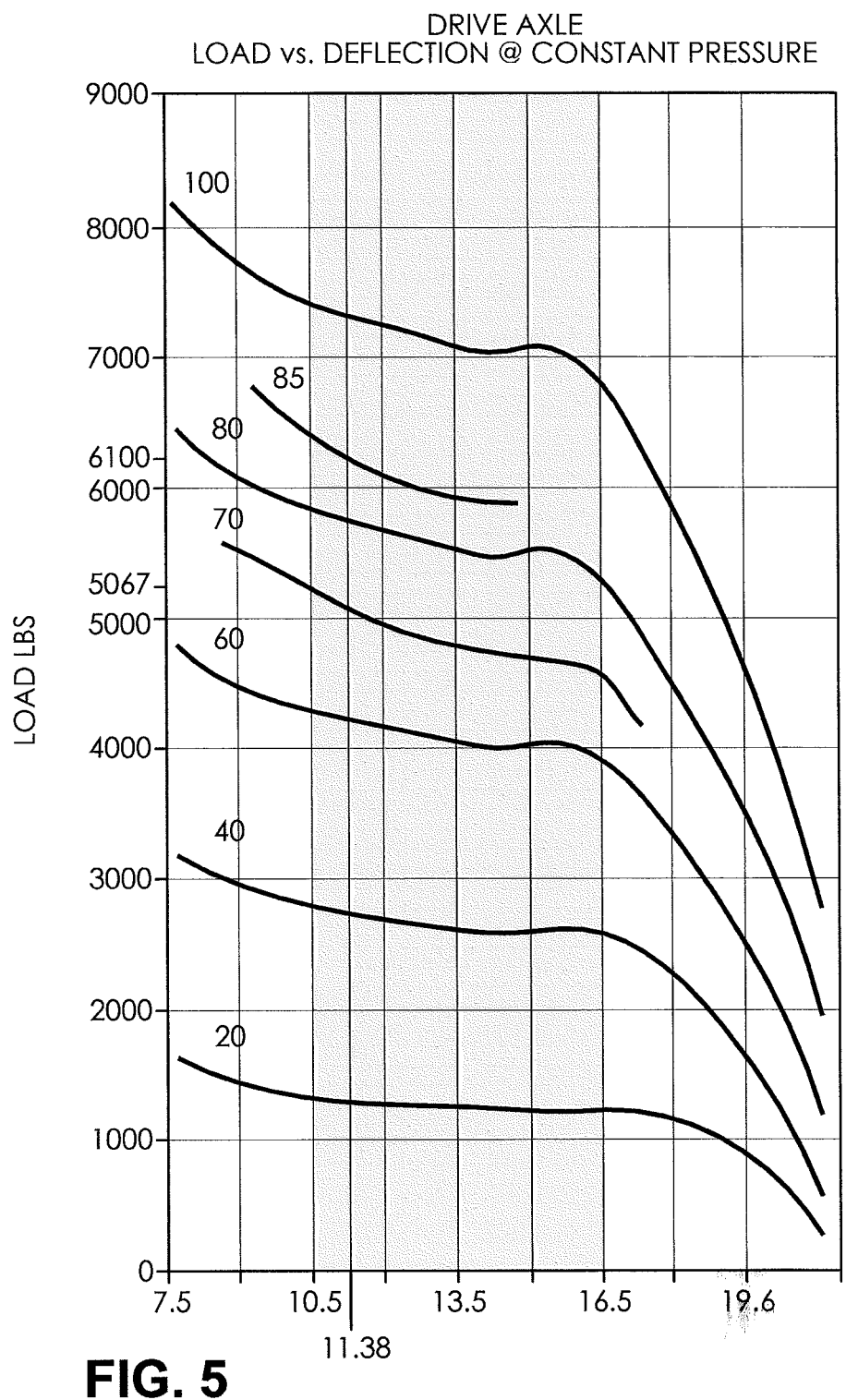
FIG. 5 is a graph illustrating load vs. deflection at constant pressure of the drive axle according to an embodiment of the present invention.
Figure 6:
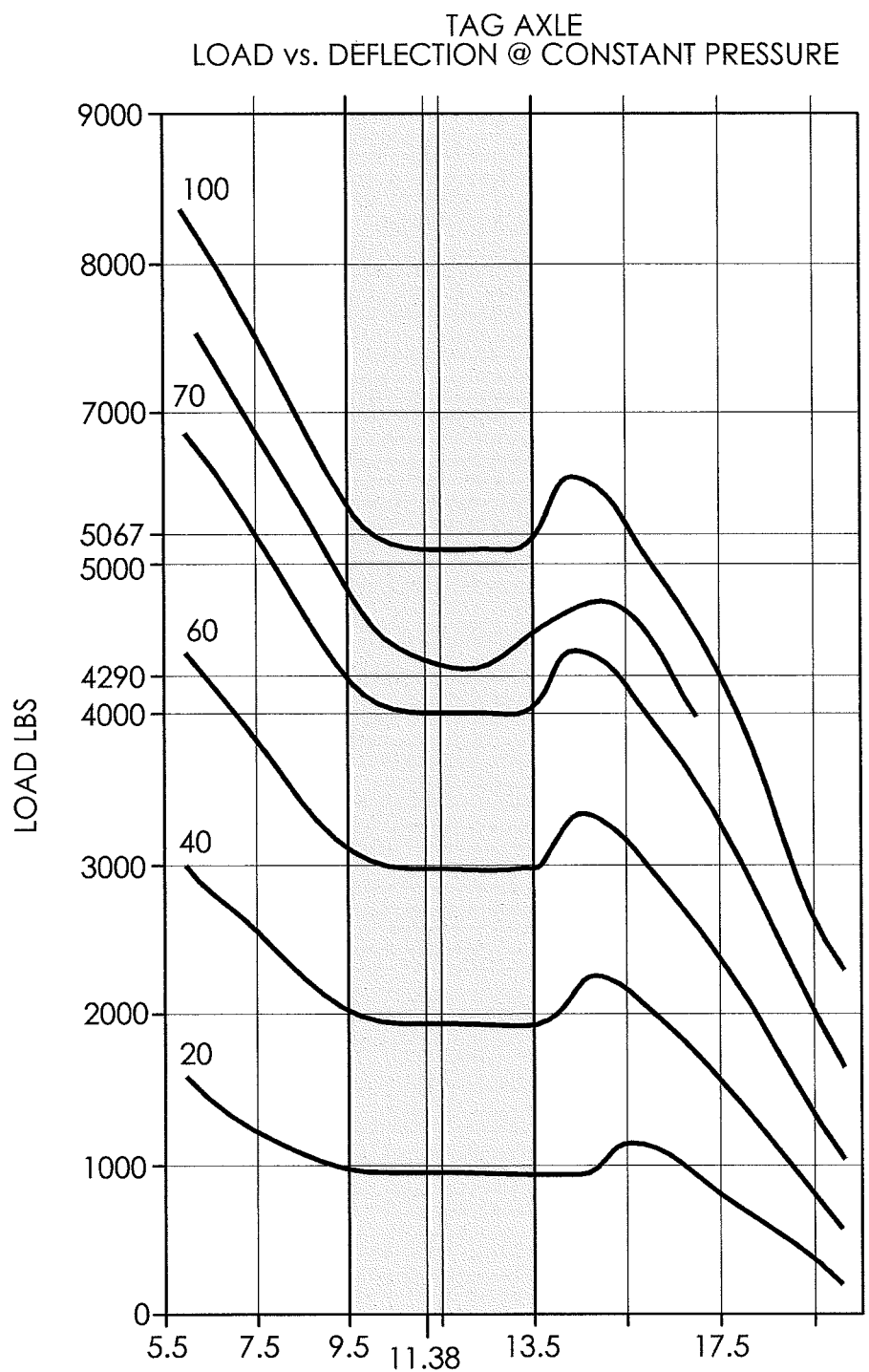
FIG. 6 is a graph illustrating load vs. deflection at constant pressure of the tag axle according to an embodiment of the present invention.

FIG. 4 illustrates one example of a 6×2 dynamic weight shift calculation in both equal loading conditions and in unequal loading conditions. Under the "Normal-Equal Loading" columns is a spread sheet calculation comparing an equally loaded tandem with 17,000 Lb on each axle 12, 14 but with different types of air springs 16, 18 on the axles 12, 14. The first "Normal" calculation has the drive axle 12 with a large diameter air spring 16 requiring 70 psi to support a 5,067 Lb spring force equal to a 17,000 Lb total axle ground load (reference FIG. 5 drive axle air spring 16 needs 70 psi at 11.38 in height to support 5,067 Lb load). The tag axle 14 has a small diameter air spring 18 requiring 100 psi to support a 5,067 Lb spring force equal to the 17,000 Lb. required GAWR (reference FIG. 6 tag axle spring 18 needs 100 psi at 11.38 in to support 5,067 Lb.).

The spread sheet as depicted on FIG. 4, has a "Shifted" calculation that assumes the air springs 16, 18 are all at the same average pressure ([100+70]/2=83 psi). The graphs on FIGS. 5 and 6 for each air spring 16, 18 show that the drive axle air spring 16 will support 6,100 Lb. and the tag air spring 18 will support 4,250 lb. at standard ride height which works out to 20,129 Lb on the drive axle 12 and 13,923 Lb. GAWR on the tag axle 14 with some graph interpolation. This means that an 18% increase in drive axle 12 load (20,129/17,000=+ 18%) can be had for an 18% improvement of tractive effort on the drive axle 12 by equalizing the pressures in the air spring 16, 18. The air springs 16, 18 as shown in the graphs (FIGS. 5 and 6) were needed since these air springs 16, 18 are not linear and a given pressure increase on one will not be an equal load change gain to the loss on the other spring even though the total tandem always needs to add up to a total 34,000 Lb GAWR.

What is claimed is:

1. An air suspension circuit for a vehicle, comprising:
a three way valve, said three way valve comprising a port one, a port two and a port three;
a first air spring connected between a drive axle of a tandem and a vehicle frame;
a second air spring connected between a tag axle of said tandem and said vehicle frame, wherein a diameter of said first air spring is larger than a diameter of said second air spring;
an air supply;
a first fluid line connected between said port one of said three way valve and said first air spring;
a second fluid line connected between said port three of said three way valve and said second air spring.

2. An air suspension circuit for a vehicle according to claim 1, wherein said three way valve is disposed on said vehicle frame between said drive axle and said tag axle.

3. An air suspension circuit for a vehicle according to claim 1, wherein said port one and said port three are in direct fluid communication to allow for the rapid transfer of air between said first air spring and said second air spring.

4. An air suspension circuit for a vehicle according to claim 1, wherein an air pressure in said second air spring is higher than an air pressure in said first air spring at the normal Gross Axle Weight Rating of said tandem.

5. An air suspension circuit for a vehicle according to claim 1, wherein port two of said three way valve and both said ports one and three of said three way valve are closed under normal operation mode.

6. An air suspension circuit for a vehicle according to claim 1, wherein fluid communication between said port one and said port three is open, and fluid communication between said port one and a port two and said port two and said port three is closed under tractive operation mode.

7. A method for shifting tandem axle loads, comprising:
providing a first air spring on a drive axle with a first diameter and a first air pressure at Gross Axle Weight Rating;
providing a second air spring on a tag axle with a second diameter and a second air pressure at Gross Axle Weight Rating;
providing a first fluid line and a second fluid line; and
providing a three way valve for transferring air between said first air spring and said second air spring.

8. A method for shifting tandem axle loads according to claim 7, wherein said second diameter is smaller than said first diameter.

9. A method for shifting tandem axle loads according to claim 7, wherein said first air pressure is less than said second air pressure under normal operation mode.

10. A method for shifting tandem axle loads according to claim 7, wherein said first air pressure is substantially equal to said second air pressure under tractive operation mode.

11. A method for shifting tandem axle load according to claim 7, wherein said three way valve comprises a port one, a port two and a port three, and wherein said port one and said port three are in direct fluid communication allowing the transfer of air between said first air spring and said second air spring via said first and second fluid lines.

12. A method for shifting tandem axle loads according to claim 7, wherein pressurized air is transferred from said second air spring through a second fluid line to said three way valve, said three way valve comprises a port one, a port two and a port three, said pressurized air is transferred to said port three to said port one of said three way valve to the first fluid line and into said first air spring for tractive operation mode.

13. A method for shifting tandem axle loads according to claim 7, wherein pressurized air is transferred from said first air spring through a first fluid line to said three way valve, said three way valve comprises a port one, a port two and a port three, said pressurized air is transferred to said port one to said port three of said three way valve to a second fluid line and into said second air spring for normal operation mode.

\* \* \* \* \*